March 16, 1954   M. K. TAYLOR   2,672,605
INDICATING APPARATUS
Filed Jan. 8, 1952   4 Sheets-Sheet 1

INVENTOR
Maurice Kenyon Taylor
BY
Cushman, Darby + Cushman
ATTORNEYS

March 16, 1954  M. K. TAYLOR  2,672,605
INDICATING APPARATUS
Filed Jan. 8, 1952  4 Sheets-Sheet 2

INVENTOR
Maurice Kenyon Taylor
BY
Cushman, Darby & Cushman
ATTORNEYS

March 16, 1954　　M. K. TAYLOR　　2,672,605
INDICATING APPARATUS
Filed Jan. 8, 1952　　4 Sheets-Sheet 4

INVENTOR
Maurice Kenyon Taylor
BY
Cushman, Darby & Cushman
ATTORNEYS

Patented Mar. 16, 1954

2,672,605

UNITED STATES PATENT OFFICE 2,672,605

INDICATING APPARATUS

Maurice Kenyon Taylor, Toronto, Ontario, Canada, assignor to Ferranti Limited, Hollinwood, England, a British company Application January 8, 1952, Serial No. 265,460

Claims priority, application Great Britain January 9, 1951

17 Claims. (Cl. 340—351)

This is a continuation-in-part of the U. S. patent application Serial No. 261,523, filed on December 13, 1951, for Positional Data Transmitting Systems, and relates to apparatus for the transmission of signals for indicating, at any given moment, which conductor out of a predetermined plurality of conductors adapted to be energised singly is energised at that moment.

The conductors may be shaped and positioned to represent one of two families of curves which intersect to form a reference system of the kind described in the aforesaid copending patent application, the other family of curves being represented by a further plurality of conductors whose selective energisation may also be indicated in accordance with the present invention.

Alternatively, each of the conductors may constitute or may be connected to a stud or fixed contact individual to that conductor, the resulting assembly of studs being arranged to be traversed by a common movable contact or slider. In this case the energised one of the conductors at any given moment is that which is connected to or constitutes the stud engaged by the slider at that moment and, accordingly, the reception at a receiver of signals for showing which conductor is energised, affords an indication of the position of the slider. If the studs are arranged in a circular path around the axis of rotation of a rotatable slider, the angular position of such slider with respect to a given datum position may in this way be transmitted and thus allow apparatus according to the invention to be used to replace magslips, potentiometers or the like in the transmission of angular positional data in servo systems.

One object of the invention is to provide improved indicating apparatus of the kind referred to.

Another object of the invention is the provision of indicating apparatus for transmitting signals to indicate at any given moment which conductor out of a predetermined plurality of conductors adapted to be energised singly is energised at that moment, said conductors each being deemed to be allocated with a different number in a scale of notation having a radix $n$, and which includes a number $p$ of power-representing windings (hereinafter referred to as "power windings"), where $p$ indicates how many of the powers of said scale of notation are used for the representation of all of the numbers allocated to said conductors, inductively coupled to each of said power windings one or more sets of $n$ digit-representing windings (hereinafter referred to as "digit windings") such that the $n$ digit windings in each set represent by different electrical characteristics the $n$ digits of zero to $(n-1)$ of said scale, means for connecting in series to each said conductor $p$ digit windings inductively coupled to said $p$ power windings each to each, each digit winding thus connected in series indicating by its said electrical characteristic the digit which represents in the number allocated to that conductor the multiple of the power which is represented by the power winding coupled to that digit winding, means whereby the energisation of each said conductor singly is accompanied by the energisation of only those of said digit windings connected in series with it, and means for deriving said signals for transmission from such energisation of the digit windings last referred to.

A further object of the invention resides in the provision of indicating apparatus as set forth in the immediately preceding paragraph but modified in that where $n$ is greater than 2 there are inductively coupled to each of said $p$ power windings one or more sets of $(n-1)$ digit windings such that the $(n-1)$ digit windings in each set represent by different electrical characteristics the $(n-1)$ digits from 1 to $(n-1)$ of said scale of notation and wherein said digit winding connecting means are arranged to connect in series to each said conductor sufficient of said digit windings to indicate by the power windings coupled to them the powers required for the representation of the number allocated to that conductor.

Yet a further object of the invention is to provide indicating apparatus as set forth in the first of the two immediately preceding paragraphs modified in that where $n$ is equal to 2 there are inductively coupled to each of said $p$ power windings one or more digit windings and wherein said digit-winding connecting means are arranged to connect in series to each said conductor sufficient of said digit windings to indicate by the power windings coupled to them the powers required for the representation of the number allocated to that conductor.

Means may be provided for energising each of said power windings at a frequency individual to it, in which case the signals indicative of each of said conductors may be derived from a circuit including that conductor and the digit windings connected in series with it.

Alternatively, means may be provided for energising selectively at a common frequency each combination of one of said conductors and the digit windings connected in series to it, in which case said signals may be derived from said power windings.

The aforesaid electrical characteristics whose difference is used for signalling purposes may be the direction of winding or the number of turns relative to each other of said digit windings.

The arrangement of the conductors among themselves may be such that the numbers allocated to adjacent conductors differ in respect of one digit only whereby the transmission of false signals through bridging of adjacent conductors by movable contact means is avoided.

Figure 1:
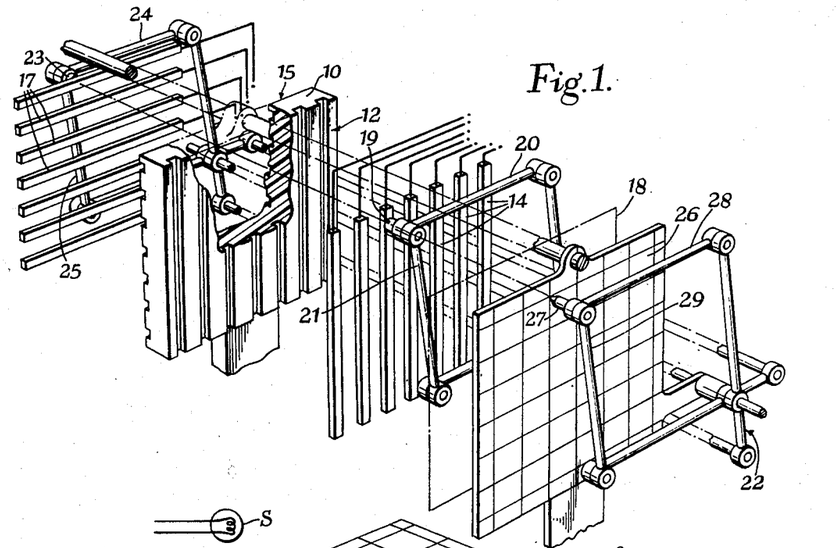
Figure 1 is an exploded perspective view of the transmitter of a positional data transmitting system utilising the present invention.

In order that the various features of the invention may be more readily understood a number of embodiments thereof will now be described with reference to the accompanying drawings in which:

Fig. 1 shows a transmitter device for a positional data transmitting system as described in detail in the aforesaid copending patent application and comprises a plain rectangular grid form of reference system with respect to which positional data in the form the rectangular co-ordinates of a chosen object position is required to be transmitted.

In this embodiment the transmitter consists of a rectangular sheet 10 of insulating material, in one face 12 of which are partially embedded a set of straight rod conductors 14 disposed normal to the horizontal or X axis of the reference grid and hereinafter referred to as the X conductors since each one represents a constant value of X for different values of Y. In the opposite face 15 of the sheet 10 are partially embedded another set of straight rod conductors 17 disposed horizontally normal to the Y axis of the reference grid and hereinafter, for similar reasons, referred to as the Y conductors. It will be appreciated that in Fig. 1 the various conductors and other parts are shown in exploded relationship for clarity of illustration. Similarly for ease of description only seven X and seven Y conductors are shown although, in practice, there will ordinarily be very many more conductors in each set.

Each conductor extends the full width or length of the chosen rectangular field 18 within which positional data is required and is sufficiently spaced from the neighbouring conductors on the same side of the sheet as to be insulated therefrom while the sheet 10 is thick enough to insulate all conductors on one face from all conductors on the other face. Although the two sets of conductors are not actually in the same plane they nevertheless form, effectively, a grid-like assembly and represent respectively two families of curves which constitute the reference system. The term "curve" here has the special sense of including a straight line.

The X set of conductors 14 has associated therewith a single movable contact 19 carried by arms 20, 21 forming part of a pantograph lever system 22 whereby such contact 19 can be moved anywhere over the rectangular field 18 so as to engage the exposed surface of any X conductor 14 along any part of its length. The Y set of conductors 17 is similarly engageable by another movable contact 23 carried by lever arms 24, 25 forming part of the same pantograph lever system 22.

Arms 28, 29 also forming part of the same pantograph lever system 22 carry at their intersection a stylus point 27 which is movable over any part of the surface of a chart 26 engraved to provide a representation of the rectangular grid reference system. The chart 26 is of the same size as the insulation sheet 10 and is mechanically held in fixed relationship therewith. The various pairs of lever arms of the pantograph system 22 are so interlinked mechanically that the stylus point 27 and the contacts 19 and 23 are always in alignment whereby movement of the stylus point to any position on the reference grid system on chart 26 causes contacts 19, 23 to move respectively to engage with those X and Y conductors which are appropriate to the co-ordinates of the indicated position. The two contacts 19, 23 are electrically connected together so that the selected X and Y conductors which are respectively engaged by the contacts are interconnected electrically in series through such contacts.

Figure 2:
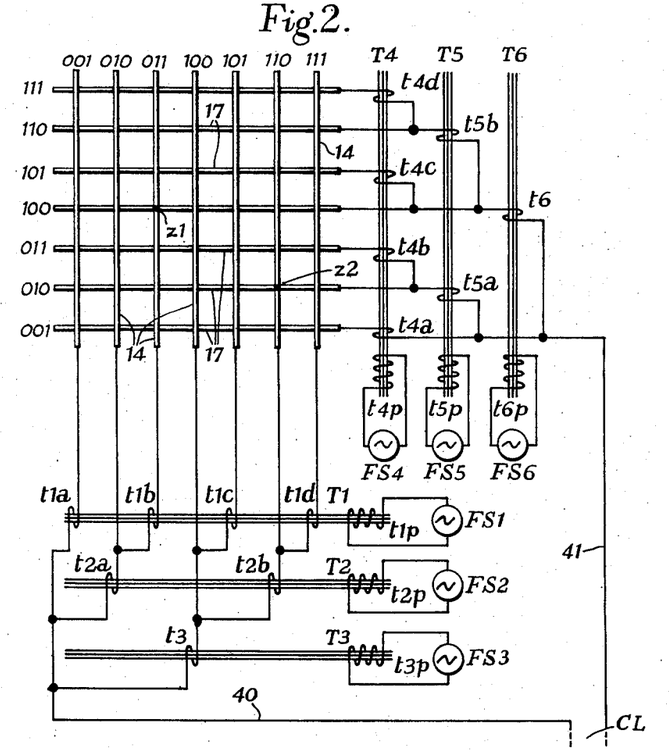
Figure 2 is a schematic circuit diagram showing one embodiment of the invention as applied to the system of Figure 1.

The set of X conductors 14 and the set of Y conductors 17 each constitutes a predetermined plurality of conductors in accordance with the present invention and the apparatus for transmitting signals to a distant receiving point to indicate, at any given moment, which of the X conductors 14 and which of the Y conductors 17 are energised, i. e. connected in series through the contacts 19, 23, at that moment, may take the form shown in Fig. 2.

In Fig. 2 the various X conductors 14 are associated with first, second and third transformers T1, T2 and T3 whose primary windings $t1p$, $t2p$ and $t3p$ constitute the so-called power windings representing respectively the successive ascending powers of the binary scale, namely, $2^0$, $2^1$ and $2^2$. The first transformer T1 has four secondary windings $t1a$, $t1b$, $t1c$ and $t1d$ which are inductively coupled to the associated power winding $t1p$ and constitute the so-called digit windings. Similarly, transformer T2 has two secondary windings $t2a$ and $t2b$ inductively coupled to its power winding $t2p$ while transformer T3 has a single secondary winding $t3$ coupled to its power winding $t3p$. The various X conductors 14 are deemed to be numbered from 001 to 111 in the binary scale of notation (i. e. 1 to 7 in the decimal scale and each conductor is connected to a common lead 40 by way of such of the digit windings of the transformers T1, T2 and T3, connected in series, as indicated by the power windings coupled to them, the powers required for the representation of the binary number allocated to that particular conductor. For example, X conductor 001 is connected to common lead 40 by way of secondary winding $t1a$ of first transformer T1 (binary power $2^0$) only; X conductor 011 is connected by way of secondary winding $t1b$ and $t2a$ of transformers T1 and T2 respectively (binary powers $2^0$ and $2^1$); and so on, X conductor 111 being connected to lead 40 by way of secondary windings $t1d$, $t2b$ and $t3$, one on each of transformers T1, T2 and T3 (binary powers $2^0$, $2^1$ and $2^2$).

The power windings $t1p$, $t2p$ and $t3p$ of transformers T1, T2 and T3 are energised continuously at frequencies individual to them, say, frequencies $f1$, $f2$ and $f3$ c./s., respectively, by oscillators or other A. C. frequency sources FS1, FS2, FS3.

Similar arrangements are provided for the Y conductors 17 except that the three transformers T4, T5 and T6, hereinafter referred to as the fourth, fifth and sixth transformers, although they again represent respectively the binary powers $2^0$, $2^1$ and $2^2$, have their power windings $t4p$, $t5p$ and $t6p$ energised at further different frequencies of, say, $f4$, $f5$ and $f6$ c./s. respectively by further frequency sources FS4, FS5 and FS6. The various Y conductors 17 are connected through the appropriate digit windings $t4a$—$t4d$, $t5a$, $t5b$ and $t6$ of the transformers T4, T5 and T6 to a common lead 41 and the two common leads 40, 41 are connected by some convenient communication link CL to the associated receiving equipment.

It will be appreciated from the above description that when any X conductor 14 is connected to any Y conductor 17, a complete series circuit will be set up between the common leads 40 and 41 and signals will be delivered to the communication link CL having frequencies which are respectively indicative of the powers required for the representation of the binary numbers allocated to the two interconnected X and Y conductors. As the scale of notation is a binary one, these frequencies are thus sufficient to indicate also the actual binary numbers of the two conductors. For example, if the X conductor 011 is connected to Y conductor 100 at point $z1$ the frequencies transmitted are those of $f1$, $f2$ and $f6$ c./s. On the other hand, if X conductor 110 is connected to Y conductor 010 at point $z2$, the transmitted frequencies are those of $f2$, $f3$ and $f5$ c./s. and so on.

Figure 3:
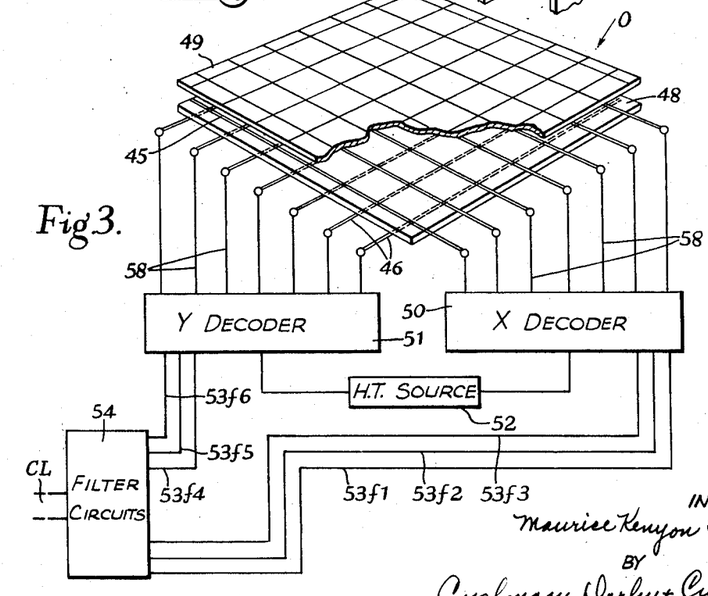
Figure 3 is a schematic diagram of a suitable receiver arrangement for the system of Fig. 1.

One form of receiving and reproducing means for use with the arrangement already described may be as shown in Fig. 3 which also forms part of an arrangement described in greater detail in the aforesaid copending patent application. Such receiver means comprises a grid-like assembly of X conductors 45 and Y conductors 46 resembling respectively the X and Y conductors 14, 17 of the transmitter and being located at right angles to one another reconstitute a rectangular grid reference system equivalent to that of the chart 26 of the transmitter. These sets of conductors are separated by a sheet 48 of electro-responsive material, for example, a sheet of white waxed paper. The conductors 45 at least, are formed by wires of sufficiently fine gauge to allow ready observation, in the illumination provided by light source S, of the light-reflecting upper surface of the normally opaque sheet 48 through an overlying transparent chart 49 which is engraved in accordance with the reference grid. Each of the X and Y receiver conductors corresponds to an appropriate one of the X and Y transmitter conductors and occupies a similar position in the grid constituted thereby.

The composite transmitted signal, consisting of two or more discrete frequencies, is applied to a filter network 54 by which each of the different frequency signals is separated into a channel individual to it, indicated in Fig. 3 as the leads $53f1$, $53f2$, $53f3$, $53f4$, $53f5$ and $53f6$. The channels $53f1$, $53f2$ and $53f3$ individual to the transmitter frequencies $f1$, $f2$ and $f3$, respectively, are applied to an X decoder device 50 while the similar three channels individual to the transmitter frequencies $f4$, $f5$ and $f6$ are applied to a Y decoder device 51.

Figure 4:
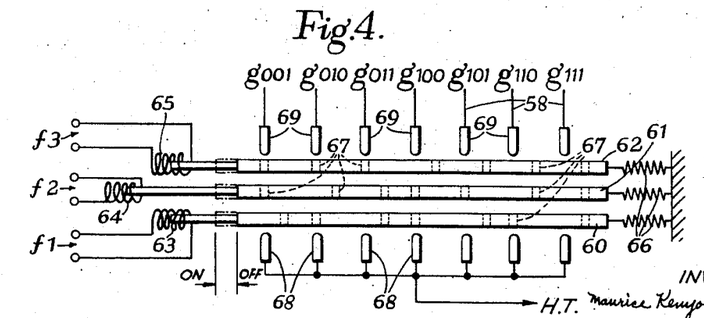
Figure 4 is a schematic diagram of one form of signal decoding means for the arrangement of Fig. 3.

One form of decoder suitable for the X device 50 is illustrated in Fig. 4 and comprises first, second and third mica strips 60, 61 and 62, each provided along its length with seven punched holes 67 in positions which will be indicated in detail later. The three strips 60, 61 and 62 are superposed on each other whereby the second strip 61 is sandwiched between the other two. Each strip is movable lengthwise against the action of a return spring 66 from an "off" position shown in full lines to an "on" position shown in chain-dotted lines by means of an individual solenoid 63, 64 or 65 respectively.

Each of the strips 60, 61 and 62 corresponds respectively with the first, second and third transformers T1, T2 and T3 of the transformer of Fig. 2 and the associated solenoids 63, 64 and 65 are arranged to be energized respectively by transmitted frequencies $f1$, $f2$ and $f3$ as received over the communication link CL after any necessary amplification and rectification.

The triple layer of mica strips 60, 61 and 62 is interposed between co-operating electrodes 68, 69 of a row of seven spark gaps, designated $g001$, $g010$ ... $g111$ in the binary scale and corresponding respectively to the similarly numbered X conductors in the reference system. The electrodes 68 on one side of the gaps are commoned and connected to one terminal of a suitable high tension supply source 52 (Fig. 3) while the other electrodes 69 are connected respectively by way of leads 58 to that one of the X conductors 45 whose position and number in the reference system corresponds to the position and number of the related conductor of the transmitter.

Each of the seven holes 67 in each mica strip is adjacent to a spark gap, the exact locations of the holes being such that when all three strips are in the "off" position as shown in full lines in Fig. 4, the holes are not aligned in any one of the seven spark gap positions and each spark gap is accordingly closed by at least one mica strip. When the first strip 60 is moved to its "on" position through energization of the first solenoid 63 by receipt over the communication link CL of a signal of frequency $f1$, the holes in the strips adjacent to spark gap $g001$ become aligned to open this gap alone. Similarly, if both first and second mica strips 60, 61 are simultaneously moved to the "on" position then the only spark-gap open is that of $g011$ and so on. The decoder device thus effectively reproduces the binary number of the required receiver conductor 45 in terms of displaced mica strips.

The Y decoder 51 consists of a precisely similar arrangement of mica strips and spark gaps and associated solenoids, designated the fourth, fifth and sixth solenoids to accord with the corresponding transformers T4, T5 and T6 of the transmitter and responsive respectively to the signals of frequencies $f4$, $f5$ and $f6$ arriving over the communication link. The electrodes 68 of the Y decoder are commoned and connected to the other terminal of the high tension supply source 52 (Fig. 3) whereby when a selected spark gap in each of the X and Y decoders is open, one of each of the X and Y conductors 45, 46 will be energised and a spark will pass between the energised conductors through the waxed paper sheet 48 at the point where such selected conductors cross one another.

The operation of the complete system is as follows. Assuming first that transmitter stylus 27 is located outside the reference field 18, contacts 19, 23 will not be in engagement with any of the X or Y conductors 14, 17 of the transmitter and all the secondary windings of transformers T1 ... T6 will be on open circuit and no signal will be delivered to communication link CL. At the receiver none of the solenoids of the decoders 50, 51 will be energised and all mica strips in each decoder will be in the "off" position so that all spark gaps will be closed and none of the receiver conductors 45, 46 will be energised.

If now transmitter stylus 27 is moved to a position within the reference field 18 to indicate the position of some object with respect to the reference grid system, contacts 19 and 23 will now be moved correspondingly to engage respectively with a selected one of each of the X conductors 14 and Y conductors 19, the engaged conductors representing the rectangular co-ordinates of the indicated point. The result of this operation is to complete a series circuit between the common leads 40 and 41 of the transmitter through the two interconnected conductors 14, 17 and the appropriate digit windings coupled to the power windings of those of the transformers T1 ... T6 as represent the powers required by the allocated binary numbers of the engaged conductors. In this way there is delivered to the communication link CL signals of two or more frequencies which are indicative of the binary numbers of the X and Y conductors involved.

At the receiver the corresponding transmitted signals applied to the filter circuits 54 are separated out in the latter and cause appropriate energisation of the related solenoids of the X and Y decoders 50 and 51 thereby causing displacement to the "on" position of those mica strips whose movement is necessary to open the two spark gaps which have the binary numbers of the X and Y receiver conductors 45, 46 representing the co-ordinates of the indicated point or object. A complete circuit is thus provided from one pole of the H. T. source 52 by way of the opened X spark gap, the corresponding X conductor 45, a further spark gap through the waxed paper 48 to the appropriate Y conductor 46 and thence through the opened Y spark gap to the other pole of the source 52.

The passage of the spark through the waxed paper 48 melts the wax of the latter over a small area and increases the translucence of the paper within this area. This gives the appearance to an observer viewing from the direction O, Fig. 4, of a darkened spot on the illuminated side of the sheet of otherwise opaque light-reflecting paper. The position of this spot, as determined by the co-ordinates engraved on the overlying chart 49 through which it is observed, corresponds to the position of the transmitter stylus 27 and so indicates the position of the object with respect to the rectangular grid of the reference system.

Figure 5:
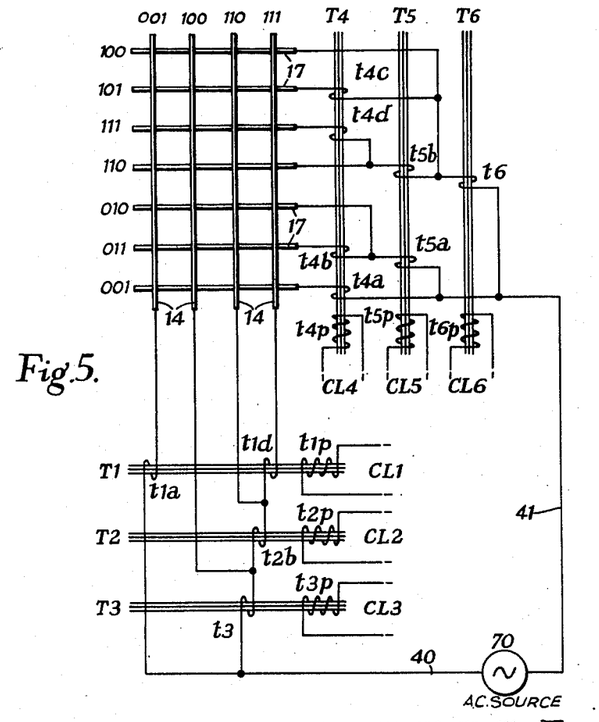
Figures 5, 6, 7, 8 and 9 are schematic circuit diagrams illustrating a number of alternative embodiments of the invention.

In the above described embodiment each of the various $p$ powers is represented by a signal frequency individual to it. Alternatively, however, it may be represented by an individual signal channel and one arrangement of this alternative form is illustrated in Fig. 5 in which the common leads 40, 41 associated with the various digit windings of the transformers T1 ... T6 are connected, not to the communication link CL, but, to an alternating current source 70 of suitable and constant frequency. Each of the power windings $t1p$ ... $t6p$ of the transformers is now individually connected through suitable individual signal channels CL1 ... CL6 to the appropriate elements of the decoders at the receiver. The digit windings thus become the primary windings of the transformers T1 ... T6 and the power windings become the secondary windings. Each power $p$ is thus now virtually represented by the signal channel connecting the appropriate power signal to the associated solenoid or equivalent receiver decoding element. Such an arrangement is obviously less economical as regards the communication link CL than that of the first described embodiment since $p$ communication channels are now required for each set of conductors but if the distance between the transmitter and receiver is relatively short this may not be of major importance. Alternatively, for economy of communication channels each of the individual channels may be dealt with sequentially, e. g. on a time division basis, by pulse or like signals which may be derived from the energised power windings of the various transformers T1 ... T6 and these pulse signals transmitted to the receiver over a single communication link.

It is not essential that all of the available conductor identification numbers be utilised or that those used be arranged consecutively. Thus in Fig. 5, for example, there are only four X conductors 14 numbered respectively 001, 100, 110 and 111.

From the examples previously given it will be appreciated that if the various conductors 14 or 17 of either the X or Y sets of conductors are arranged among themselves in strict numerical order, the possible bridging of two adjacent conductors by the movable contact associated therewith as the energisation of the conductors is being shifted from one to another may result in the transmission of a false signal. If, for example, in the arrangement of Figs. 1 and 2, in passing from Y conductor 001 to the next Y conductor 010 the movable contact 23 should happen to bridge them, the false signal 011 is transmitted while the bridging contact persists since the unit digit windings $t4a$ and $t5a$ of the fourth and fifth transformers T4 and T5 respectively are then energised. Similarly if the adjacent 011 and 100 conductors are bridged, a 111 signal is transmitted.

This difficulty may be avoided in the manner also illustrated in respect of the Y conductors 17 in Fig. 5 by arranging the identification numbering of the various conductors, not in strict numerical order, but in an order such that the binary numbers of adjacent conductors differ in respect of one digit only. Fig. 5 shows that the seven Y conductors 17 are arranged in the order 001, 011, 010, 110, 111, 101 and 100. With this arrangement false signalling due to bridging is rendered impossible and the only thing that can happen is a slightly premature signalling or, alternatively, a slightly prolonged signalling of the characteristic of one conductor as the movable contact is being moved onto or away from that conductor.

The invention may also be employed for the transmission of indications of the angular position of an object with respect to some other object or to a given datum position. The apparatus thus provided is capable of functioning in similar manner to that of a magslip or other angular information transmitting means.

Figure 6:
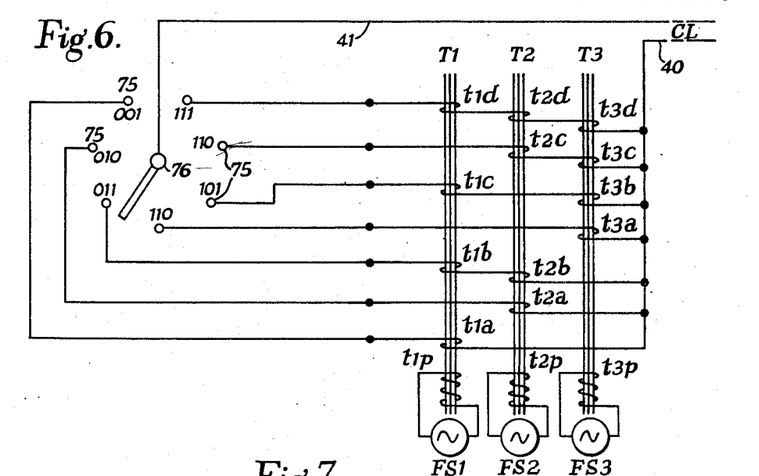

Fig. 6 illustrates one typical embodiment of this last mentioned kind wherein each conductor is in the form of a fixed contact or stud 75. Again for simplicity a total of only seven studs is assumed but in practice there will usually be many more. The studs 75 are deemed to be numbered, as were the conductors of the previous embodiments, in accordance with some convenient scale of notation and in this example the binary scale of radix 2 is again chosen. The studs 75 are disposed in a circle around the axis of rotation of a rotary slider or wiper arm 76 which is arranged to traverse and contact with any one of the studs 75 during its rotary movement.

Associated with the studs 75 are $p$ transformers (in this case a total of three since as there are only seven studs only those binary powers $2^0$, $2^1$ and $2^2$ need be dealt with) representing respectively the required powers of 2 and each transformer T1, T2 or T3 comprises a power winding $t1p$, $t2p$ or $t3p$ coupled to digit windings in generally similar manner to the arrangement of Fig. 2. The arrangement may be substantially identical with that of the first described embodiment in association with either the X or with the Y set of conductors of such embodiment whereby each of the studs 75 is connected to one common lead 40 by way of sufficient of the digit windings of the transformers T1 . . . T3, connected in series as will indicate the binary powers required for the representation of the binary number allocated to the particular stud. The other common lead 41 is connected directly to the slider 76. In the particular arrangement illustrated however, the previous sharing of digit windings by some conductors or studs is avoided by providing four unit value digit windings on each transformer and then connecting each conductor to the common lead by way of appropriate individual digit windings.

Where, as illustrated, the powers are represented by individual frequencies, each power winding $t1p$, $t2p$ and $t3p$ of the transformers T1 . . . T3 is energised at the frequency individual to it by sources FS1 . . . FS3 operating respectively at the frequencies $f1$, $f2$ and $f3$. On the other hand where, as in the embodiment of Fig. 5 previously described, the various $p$ powers are represented by $p$ separate channels, an A. C. source of constant frequency may be applied between the common leads 40, 41 while the outputs from each of the individual power windings $t1p$, $t2p$ and $t3p$ are applied respectively to the individual communication channels.

A suitable receiving arrangement for use with such an angular data transmitting device may comprise a circular arrangement of neon lamps, one corresponding to each stud and each of the lamps being arranged to be illuminated when a corresponding spark gap is opened in a decoding device as described with reference to Fig. 4. Other ways of effecting indication will also be apparent.

The disposition of the various conductor studs 75 of the last embodiment around a circular path is clearly not essential if angular positional data is not required to be transmitted. The contacts may be in any desired path, e. g. a straight path and with such an arrangement the invention may be used to indicate the particular contact engaged by the moving contact of, for example, a potentiometer.

With the embodiments so far described it will be observed that no signals are transmitted in respect of those powers which are not required for the representation of the number concerned with the conductor identification. In other words, the zero digit of the identifying number is represented by a zero signal. Since a zero signal may in some cases be due to a fault in the apparatus it is usually preferable to transmit zero significance by a definite signal. This requirement may be provided very simply in the case of the embodiments just previously described by supplying, instead of one or more digit windings coupled to each power winding, one or more sets of digit windings, such that the windings in each set represent by different electrical characteristics the respective digits "0" and "1" of the binary scale.

Figure 7:
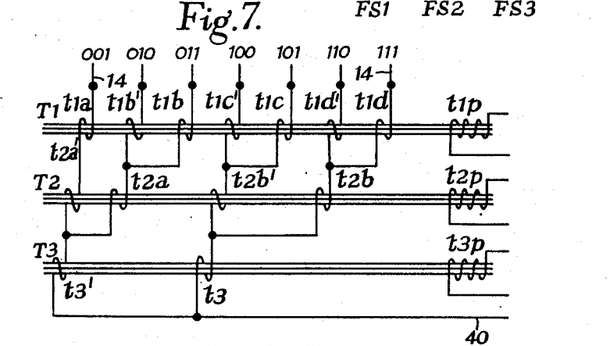

These electrical characteristics whose difference is used to signal the appropriate significance of the power indicating digit may be the relative directions in which the digit windings are wound on the transformers, all zero digit windings coupled to the same power winding being wound in one direction and all the associated unit digit windings being wound in the other direction. Fig. 7 shows one version of this modification as applied to the X conductors of Fig. 2. The first transformer T1 is provided with power winding $t1p$ and seven digit-windings four of which, $t1a$, $t1b$, $t1c$ and $t1d$, are wound in one direction and the remaining three of which $t1b'$, $t1c'$ and $t1d'$ are wound in the opposite direction. The digit windings $t1a$ . . . $t1d$ are representative of the digit value "1" whereas the reversely wound windings $t1b'$ . . . $t1d'$ are representative of the digit value "0." The transformer T2 is similarly provided with four digit windings, two of which, $t2a$ and $t2b$ are in one direction and representative of digit value "1" and the others $t2a'$ and $t2b'$ are in the reverse direction and representative of digit value "0." The various conductors are connected in similar manner to that previously described to the common lead 40 by way of the appropriate selection of digit windings to signal the required conductor identification number. With this arrangement, digit value "0" is signalled by an oscillation of opposite phase to that of digit value "1" and means such as a reference oscillator will need to be provided at the receiver to distinguish the "1" signals from the "0" signals. It will be observed that a fourth zero digit winding ($t1a$) is not provided on transformer T1 as the binary number 000 is not used. If it was then such additional winding would be needed.

The digit windings may be given an electrical characteristic other than the direction which they are wound. They may, for example, be given twice the number of turns to represent a unit digit compared with those used to represent a zero digit, the corresponding signals thus distinguishing the digits by different voltage amplitudes. One example of such an arrangement is given in Fig. 8 which resembles Fig. 7 but has the various unit digit-windings $t1a$, $t1b$, $t1c$, $t1d$, $t2a$, $t2b$, $t3$ of transformers T1, T2, T3, each wound with twice the number of turns as compared with the remaining zero digit windings $t1b'$, $t1c'$, $t1d'$, $t2a'$, $t2b'$ and $t3'$.

Where there are more than illustrated seven studs or conductors or more than eight where a further conductor is represented by a zero signal, more transformers than the three shown are, of course, required. Where there are $p$ transformers the maximum number of conductors that may be represented by a binary number in the apparatus according to the invention is $2^p$ or $2^{p-1}$ where zero signalling is not employed.

In all of the examples given above the scale of notation is assumed to be the binary scale. Other scales, however, may well be adopted and the arrangement of these in each case is very similar to those already described with a principal difference that each set of digit windings is suitably enlarged to cover the additional digits needed for each power. Thus where $n$ is the radix of the scale there are in each set of windings either $n$ digit windings representing by different electrical characteristics the digits zero to $(n-1)$ or $(n-1)$ windings similarly representing the digits 1 to $(n-1)$ in the case where the zero digit is not signalled.

Figure 8:
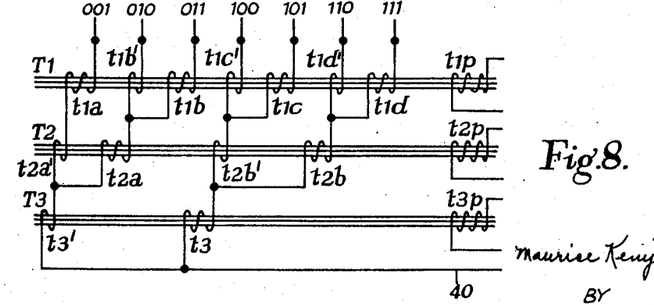
Figure 9:
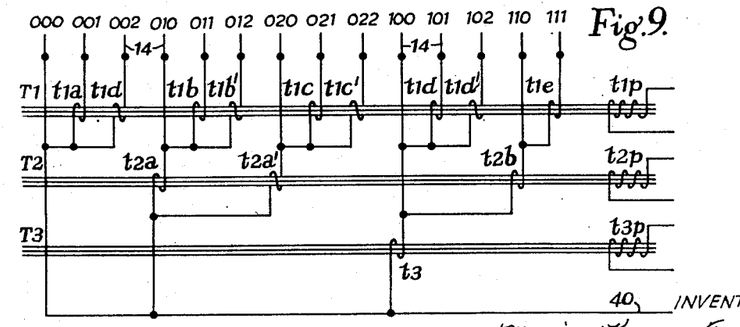

Fig. 9 provides an illustration of an example similar to Figs. 7 and 8 but using the ternary scale. In this embodiment each set of $(n-1)$, i. e. 2, digit windings consists of equal but oppositely wound windings representing respectively the digits 1 and 2. The required three digits 0, 1 and 2 are thus signalled respectively by no signal, an in-phase signal and a contra-phase signal. The "1" representing digit windings are those of $t1a$, $t1b$, $t1c$, $t1d$, $t1e$, $t2a$, $t2b$ and $t3$ while the "2" representing digit windings are those of $t1a'$, $t1b'$, $t1c'$, $t1d'$ and $t2a'$. In an alternative arrangement each set of digit windings may comprise three windings wound in the same direction but having different number of turns. In this case the three digits 0, 1 and 2 are signalled by voltages of different amplitude.

Various modifications may obviously be made without departing from the scope of the invention. For example, in the illustrated embodiments of Figs. 6, 7, 8 and 9 the various powers $p$ may be represented either by different frequencies or by channels individual to themselves.

I claim:

1. Indicating apparatus for transmitting signals to indicate at any given moment which conductor of a predetermined plurality of conductors adapted to be energised singly is energised at that moment, said conductors being deemed to be allocated individual numbers in accordance with a scale of rotation of radix $n$, which comprises a chosen number $p$ of power windings where $p$ indicates how many of the powers of said scale are used for the representation of all of the numbers allocated to said conductors, inductively coupled to each of said power windings at least one set of $n$ digit windings such that the $n$ digit windings in each set represent by different electrical characteristics the $n$ digits from zero to $(n-1)$ of said scale, means for connecting in series to each said conductor $p$ digit windings inductively coupled to said $p$ power windings each to each, each digit winding thus connected in series indicating by its electrical characteristic the digit representing in the number allocated to that conductor the multiple of the power represented by the power winding coupled to that digit winding, means whereby the energisation of each conductor singly is accompanied by energisation of only those of said digit windings connected in series with it and means for deriving said signals for transmission from such energisation of the last mentioned digit windings.

2. Indicating apparatus for transmitting signals to indicate at any given moment which conductor of a predetermined plurality of conductors adapted to be energised singly is energised at that moment, said conductors being deemed to be allocated individual numbers in accordance with a scale of notation of radix $n$, where $n$ is greater than 2, which comprises a number $p$ of power windings where $p$ indicates the chosen powers of said scale which are used for the representation of all of the numbers allocated to said conductors, inductively coupled to selected ones of said power windings at least one set of not less than two digit windings such that the digit windings in each set represent by different electrical characteristics the $(n-1)$ digits from 1 to $(n-1)$ of said scale, means for connecting in series with each said conductor sufficient of said digit windings to indicate the number allocated to that conductor, each digit winding thus connected in series indicating by its electrical characteristic the coefficient of the power represented by the power winding coupled to that digit winding, means whereby the energisation of each conductor singly is accompanied by energisation of only those of said digit windings connected in series with it and means for deriving said signals for transmission from such energisation of the last mentioned digit windings.

3. Indicating apparatus in accordance with claim 2 which comprises means for energising each of said power windings separately with alternating current at a frequency individual to it and in which said signal deriving means comprises a circuit connection including the energised conductor and the digit windings connected in series with it.

4. Indicating apparatus in accordance with claim 2 which comprises means for energising selectively with alternating current of a given common frequency each combination of the energised conductor and the digit windings connected in series with it and in which said signal deriving means comprises said power windings.

5. Indicating apparatus in accordance with claim 2 in which said set of digit windings comprises two separate windings connected to provide alternative electrical characteristics consisting of alternating-current signals of opposite phase.

6. Indicating apparatus in accordance with claim 2 in which said set of digit windings comprises at least two windings having differing numbers of turns relative to each other.

7. Indicating apparatus for transmitting signals to indicate at any given moment which conductor of a predetermined plurality of conductors adapted to be energised singly is energised at that moment, said conductors being deemed to be allocated individual numbers in accordance with a scale of notation of radix $n$ which comprises a chosen number $p$ of power windings where $p$ indicates how many of the powers of said scale are used for the representation of all of the numbers allocated to said conductors, inductively coupled to each of said power windings a set of digit windings, each digit winding representing a coefficient of a power of $n$ and those digit windings representing different coefficients of a common power having different electrical characteristics, means for connecting in series to each said conductor sufficient of said digit windings to indicate by the power windings coupled to them the powers required for the representation of the number allocated to that conductor, means whereby the energisation of each conductor singly is accompanied by energisation of only those of said digit windings connected in series with it and means for deriving said signals for transmission from such energisation of the last mentioned digit windings.

8. Indicating apparatus for transmitting signals to indicate at any given moment which conductor of a predetermined plurality of conductors adapted to be energised singly is energised at that moment, said conductors being deemed to be allocated individual identification numbers in accordance with the binary scale, which comprises a plurality of transformers, one for representation of each of the powers in the binary scale used for the identification of all the conductors, each of said transformers having a first winding and at least one further winding, a plurality of sources of alternating current, one for each of said transformers and connected to said first winding thereof, said sources each being of different frequencies from one another, a contact movable relatively to each of the conductors to engage and energise any desired one selectively, a first common output lead connected to said contact, a second common output lead and circuit connections between each of said conductors and said second common output lead by way of a said further winding of those of said transformers which represent binary powers whose coefficient is unity in the identification number of said conductor.

9. Indicating apparatus for transmitting signals to indicate at any given moment which conductor of a predetermined plurality of conductors adapted to be energised singly is energised at that moment, said conductors being deemed to be allocated individual identification numbers in accordance with the binary scale, which comprises a plurality of transformers, one for representation of each of the powers in the binary scale used for the identification of all the conductors, each of said transformers having a first winding and at least one further winding, a plurality of output channels, one for each of said transformers, circuit means connecting each of said first windings to individual ones of said output channels, a single source of alternating current, a contact movable relatively to each of the conductors to engage and energise any desired one selectively, circuit means connecting one terminal of said alternating current source to said contact and further circuit means between each of said conductors and the other terminal of said alternating current source by way of a said further winding of those of said transformers which represent binary powers whose coefficient is unity in the identification number of said conductor.

10. Indicating apparatus for transmitting signals to indicate at any given moment which conductor of a predetermined plurality of conductors adapted to be energised singly is energised at that moment, said conductors being deemed to be allocated individual numbers in accordance with a scale of notation of radix $n$, which apparatus comprises a number $p$ of power windings where $p$ indicates the total number of powers of said radix which are used for the representation of all of the numbers allocated to said conductors, digit windings inductively coupled to each of said power windings, at least one of said power windings having inductively coupled thereto digit windings of individually different electrical characteristics including digit windings having a first electrical characteristic individual to a given coefficient of the power of $n$ represented by that power winding and further digit windings having a second electrical characteristic individual to a second coefficient of the same power of $n$, the individual conductors being adapted to be connected in series with selected digit windings such that each of said series of windings includes sufficient of the digit windings representing the respective powers of $n$, having regard also to the coefficients of those powers, to identify the number allocated to the respective conductor, means whereby the energisation of each conductor singly is accompanied by energisation of only those of said digit windings connected in series with it and means for deriving said signals for transmission from such energisation of the last mentioned digit windings.

11. Indicating apparatus for transmitting signals to indicate at any given moment which conductor of a predetermined plurality of conductors adapted to be energised singly is energised at that moment, said conductors being deemed to be allocated individual numbers in accordance with a scale of notation of radix $n$, which comprises a chosen number $p$ of power windings where $p$ indicates a plurality of ascending powers of $n$ required to be used for the representation of all the numbers allocated to said conductors, a set of digit windings inductively coupled to each of said power windings each set of digit windings coupled to a power winding being indicative of a given coefficient of that power of $n$ appearing in the number code employed for the conductors, at least one further set of digit windings inductively coupled to at least one of said power windings, said further set of digit windings representing a further coefficient of that particular power of $n$ and having a distinctive electrical characteristic distinguishing them from that set of the first mentioned digit windings indicative of the said given coefficient of the same power of $n$ the individual conductors being adapted to be connected in series with selected digit windings such that each of said series of windings includes sufficient of the digit windings representing the respective powers of $n$, having regard also to the coefficients of those powers, to identify the number allocated to the respective conductor, means whereby the energisation of each conductor singly is accompanied by energisation of only those of said digit windings connected in series with it and means for deriving said signals for transmission from such energisation of the last mentioned digit windings.

12. Indicating apparatus for transmitting signals to indicate at any given moment which conductor of a predetermined plurality of conductors adapted to be energised singly is energised at that moment, said conductors being deemed to be allocated individual numbers in accordance with a scale of notation of radix $n$, which comprises a chosen number $p$ of power windings where $p$ indicates a plurality of ascending powers of $n$ required to be used for the representation of all the numbers allocated to said conductors, a set of digit windings inductively coupled to each of said power windings, at least one of said sets comprising a first winding or windings indicative of one coefficient of the respective power of $n$ employed in the adopted scale whilst any coefficient of $n$ different from that represented by said first winding or windings is represented by a further winding or windings also inductively coupled to the respective power winding, the said first winding or windings indicative of one coefficient and the said further winding or windings indicative of another coefficient of the same power having different electrical characteristics individual to said different coefficients, each conductor being adapted to be connected to those of said digit windings taken in series which correspond to those coefficients of the powers of $n$ included in the number of that conductor which are necessary for the identification of that conductor, means whereby the energisation of each conductor singly is accompanied by energisation of only that series of digit windings connected thereto which are necessary for the identification of that conductor, and means for deriving said signals for transmission from such energisation of the said respective series of digit windings.

13. Apparatus in accordance with claim 10 including means for energising said power windings with alternating current and wherein digit windings inductively coupled to the same power windings and indicative of different coefficients of that power are wound to provide alternating current signals of opposite phase.

14. Apparatus in accordance with claim 10, including means for energising each of said $p$ power windings with alternating current at a frequency individual to it, inductively coupled to one of said power windings a digit winding indicative of one coefficient of said power wound to provide a signal of one phase, and a further digit winding indicative of another coefficient of the same power wound to provide a signal of another phase.

15. Apparatus in accordance with claim 10 wherein digit windings inductively coupled to the same power winding and indicative of different coefficients of that power have different turns ratios to provide signals of differing amplitude.

16. Apparatus in accordance with claim 10 including means for energising each of said $p$ power windings with alternating current of a frequency individual to it, inductively coupled to one of said power windings a digit winding indicative of one coefficient of said power having one ampere-turns value, and a further digit winding indicative of another coefficient of the same power having a different ampere-turns value whereby said digit windings provide signals of different amplitude.

17. Apparatus in accordance with claim 10 which comprises means for energising with alternating current of a common frequency those digit windings indicative of the same coefficient of the respective powers of $n$, and a transmitting channel individual to each of said $p$ power windings.

MAURICE KENYON TAYLOR.

References Cited in the file of this patent
UNITED STATES PATENTS

| Number | Name | Date |
|---|---|---|
| 2,207,743 | Larson et al. | July 16, 1940 |